Figure 1:
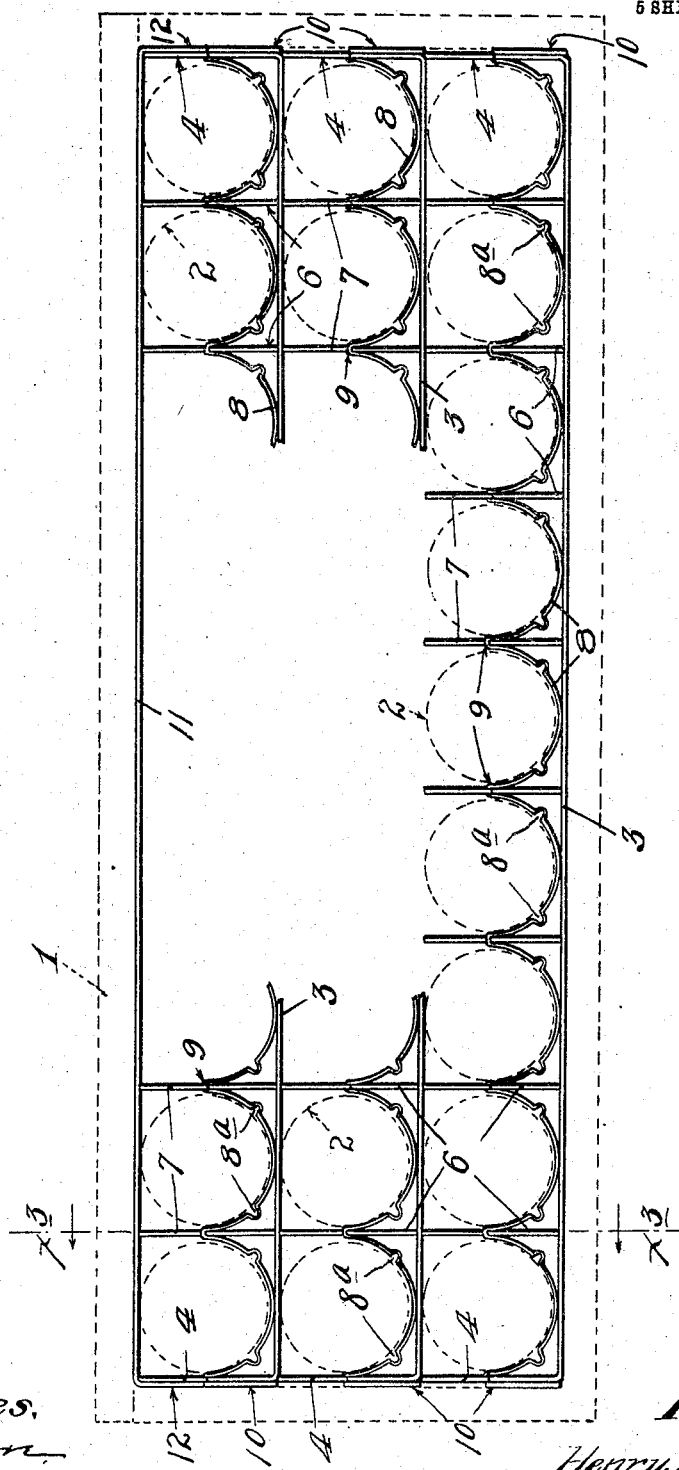

No. 782,573. PATENTED FEB. 14, 1905.
H. J. LEWIS.
CIGAR BOX FILLER.
APPLICATION FILED MAR. 8, 1904.

5 SHEETS—SHEET 1.

Witnesses,
H. D. Kilgore
E. W. Jeppesen

Inventor
Henry J. Lewis.
By his Attorneys,
Williamson & Machen

No. 782,573. PATENTED FEB. 14, 1905.
H. J. LEWIS.
CIGAR BOX FILLER.
APPLICATION FILED MAR. 8, 1904.

5 SHEETS—SHEET 2.

Witnesses
H. D. Kilgore
E. W. Jeppesen

Inventor
Henry J. Lewis,
By his Attorneys,
Williamson & Merchant

No. 782,573. PATENTED FEB. 14, 1905.
H. J. LEWIS.
CIGAR BOX FILLER.
APPLICATION FILED MAR. 8, 1904.
5 SHEETS—SHEET 3.
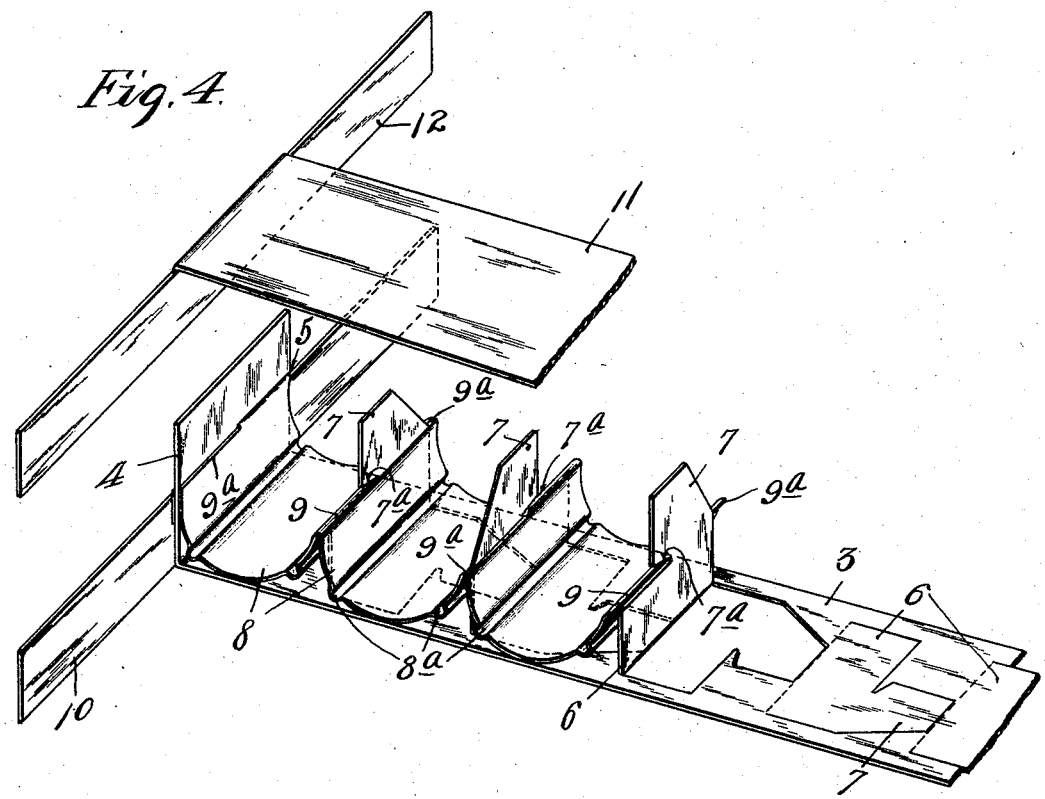
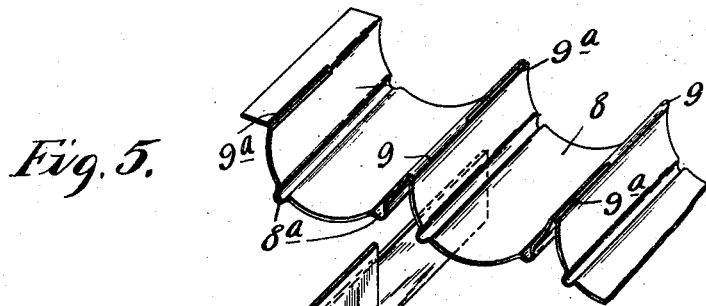
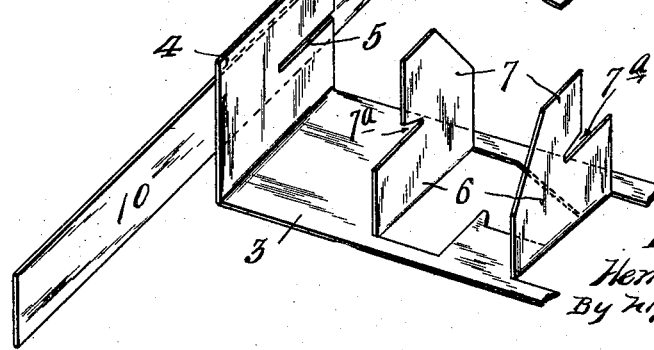
Witnesses.
N. S. Kilgore
E. W. Jeppesen
Inventor:
Henry J. Lewis.
By his Attorneys.

No. 782,573. PATENTED FEB. 14, 1905.
H. J. LEWIS.
CIGAR BOX FILLER.
APPLICATION FILED MAR. 8, 1904.

5 SHEETS—SHEET 4.

Witnesses.
H. D. Kilgore
E. W. Jeppesen

Inventor.
Henry J. Lewis.
By his Attorneys,
Williamson Merchant

No. 782,573. PATENTED FEB. 14, 1905.
H. J. LEWIS.
CIGAR BOX FILLER.
APPLICATION FILED MAR. 8, 1904.
5 SHEETS—SHEET 5.
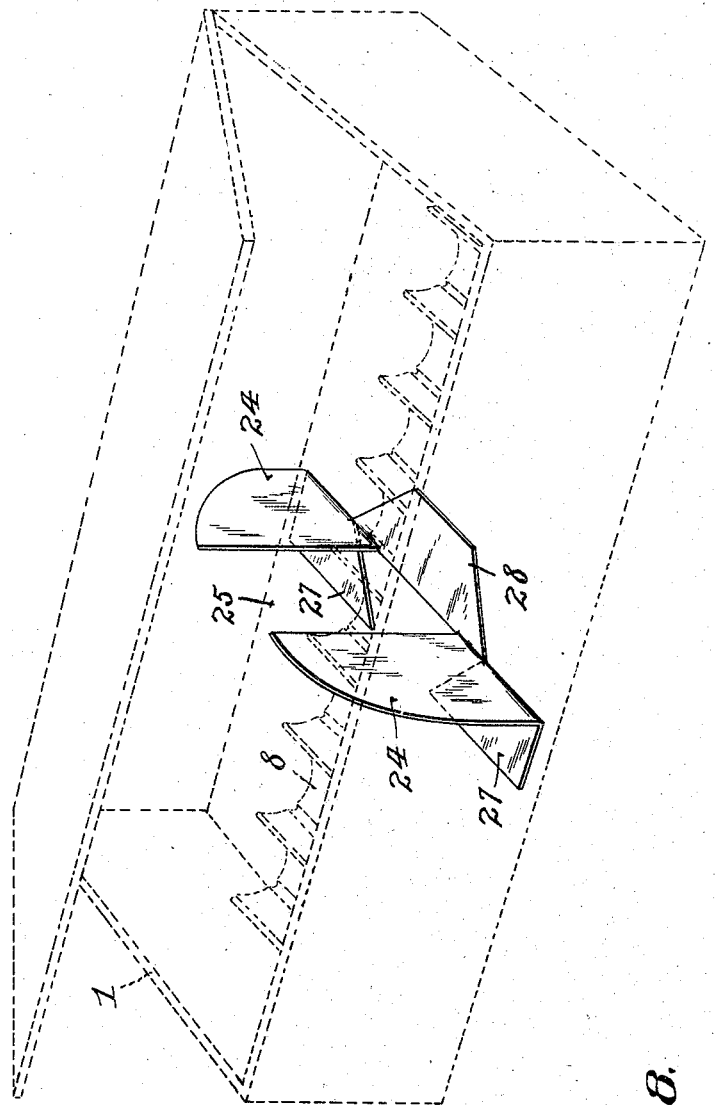
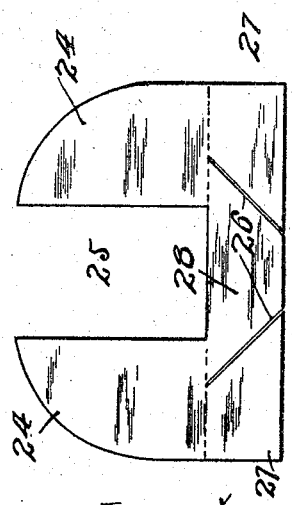
Witnesses.
H. D. Kilgore
E. W. Jeppesen
Inventor.
Henry J. Lewis.
By his Attorneys,
Williamson Merchant No. 782,573. Patented February 14, 1905.

UNITED STATES PATENT OFFICE.

HENRY J. LEWIS, OF MINNEAPOLIS, MINNESOTA.

CIGAR-BOX FILLER.

SPECIFICATION forming part of Letters Patent No. 782,573, dated February 14, 1905.

Application filed March 8, 1904. Serial No. 197,187.

*To all whom it may concern:*

Be it known that I, HENRY J. LEWIS, a citizen of the United States, residing at Minneapolis, in the county of Hennepin and State of Minnesota, have invented certain new and useful Improvements in Cigar-Box Fillers; and I do hereby declare the following to be a full, clear, and exact description of the invention, such as will enable others skilled in the art to which it appertains to make and use the same.

My present invention has for its object to provide an improved device for holding cigars within a box and for relieving them from box-pressure, which device I term a "cigar-box filler."

To the above ends the invention consists of the novel devices and combinations of devices hereinafter described, and defined in the claims.

It is a well-known fact that the delicate texture of the tobacco of a good cigar is much injured by compression. For this reason high-grade cigars are made by hand instead of being made in wooden, paper, or metal molds, as is done in some cheaper grades of cigars. It is also a well-known fact that a good cigar or even a cheap grade of cigar is much injured by being pressed out of shape by so-called "box-pressure," under which it is customary to pack them within the box.

In my prior patent, No. 748,624, issued of date January 5, 1904, I have disclosed and claimed what I have therein termed a "self-sustaining cigar-carrier," used as a cigar-box filler to prevent box-pressure on the cigars. My present invention accomplishes the same general result as my said prior invention, but differs therefrom materially in many respects and has certain advantages over the said prior device, as will hereinafter more fully appear.

The invention is illustrated in the accompanying drawings, wherein like characters indicate like parts throughout the several views.

Figure 2:
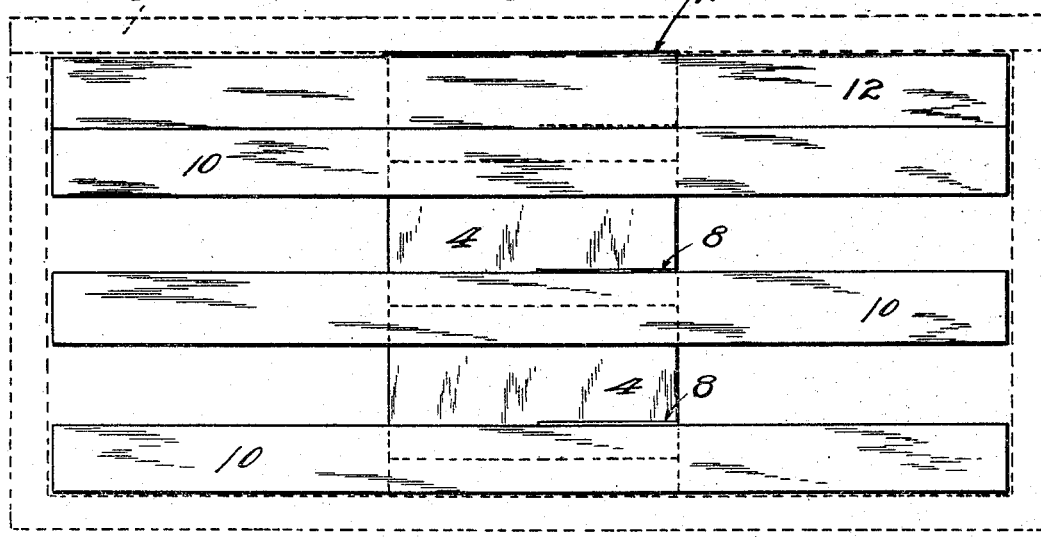
Figure 3:
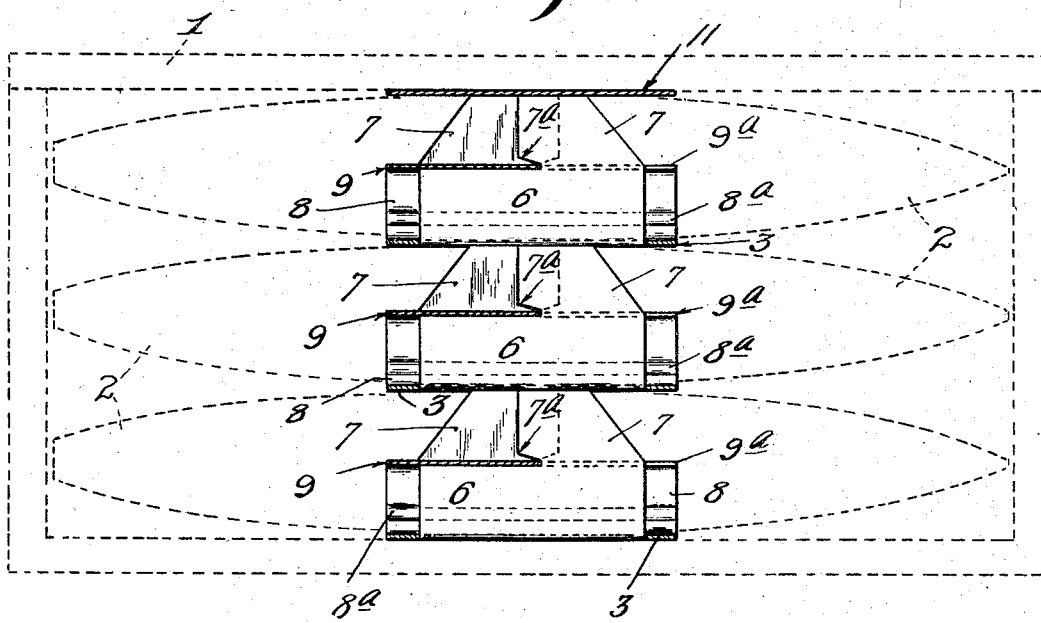
Figure 6:
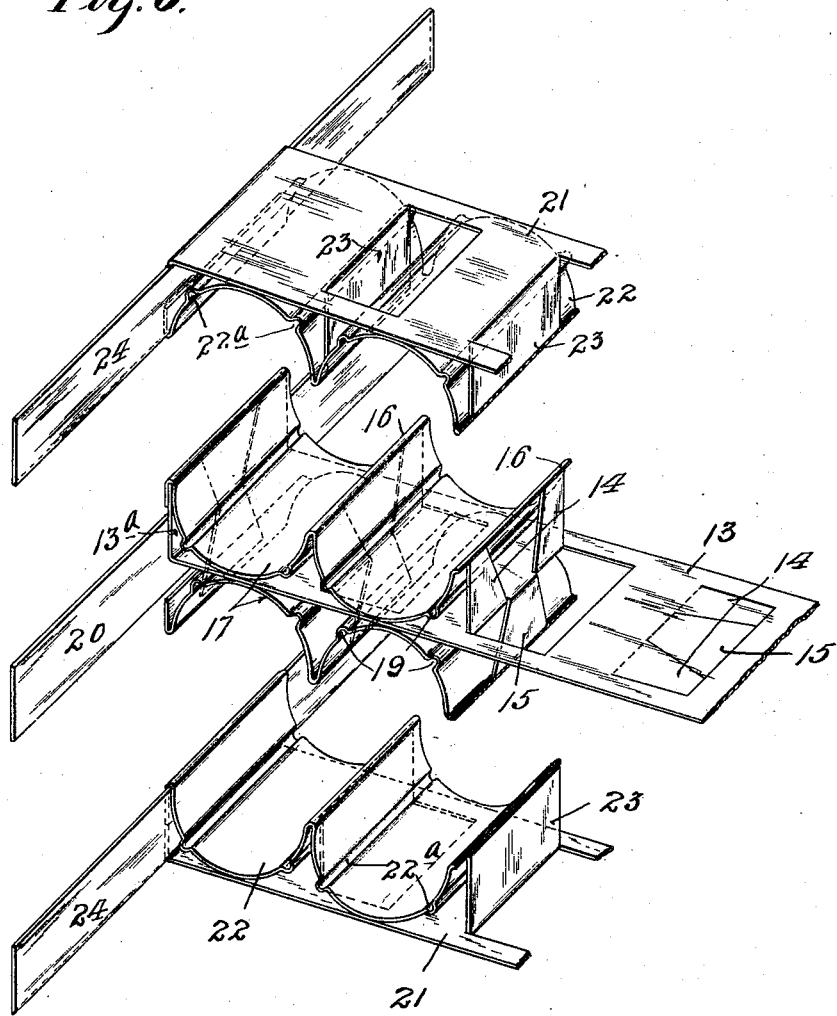

Figure 1 is a view in side elevation with some parts broken away, showing my improved cigar-box filler in full lines and showing the cigar-box and the cigars in dotted lines. Fig. 2 is an end elevation of the parts shown in Fig. 1. Fig. 3 is a transverse vertical section on the line $x^3 x^3$ of Fig. 1. Figs. 4 and 5 are detail views in perspective with parts broken away, showing portions of the improved cigar-box filler. Fig. 6 is a detail view in perspective corresponding to Figs. 4 and 5, but illustrating a modified construction. Fig. 7 is a perspective view showing a spacing device by full lines and showing the cigar-box and one of the strips of the filler in dotted lines, and Fig. 8 is a plan view showing the spacing device illustrated in Fig. 7 spread out flat.

In the drawings the numeral 1 indicates a cigar-box, and the numeral 2 the cigars, which parts are indicated only by dotted lines.

In my present invention the "cigar-box filler," so called, is made up of a plurality of long and preferably quite narrow trays having closely-positioned approximately semicylindrical pockets adapted to receive the cigars.

In the construction illustrated in Figs. 1 to 5, inclusive, the numeral 3 indicates the so-called "base-strip," preferably formed from quite heavy and quite stiff paper, having its ends turned upward at 4 and slit at 5. The intermediate portion of the base-strip 3 is cut, as best indicated in Figs. 4 and 5, so as to afford portions that may be turned vertically upward to form supporting-webs 6, having vertical projections 7. The upper edges of the supporting-webs 6 preferably extend a little more than half-way across the upturned portions and extend under the vertical projections 7 to form lock-shoulders $7^a$, for an important purpose which will presently appear. Furthermore, it is important to note that alternate upturned portions 6 7 are cut in the same manner, so that when turned upward they stand in line with each other longitudinally of the strip 3, while the intermediate upturned portions are reversely cut, so that when turned upward they aline with each other, but are offset in zigzag order with respect to the first-noted upturned portions. The undercut shoulders $7^a$ of adjacent upturned portions therefore project in opposite directions. The importance of this construction will presently appear. To form elastic or expansible pockets to hold the cigars, I employ a strip 8, preferably formed of paper which is light as compared with the base-strip 3. This strip 8 is fluted or bent to form a plurality of closely-positioned semicylindrical pockets for receiving the cigars. The ridges 9, formed at the junctions of the pockets of the strip 8, are alternately slit from opposite sides of the strip, about half-way across the strip, as best shown in Fig. 5 and as indicated at 9ª. The pockets of the said strips 8 are formed with outwardly-bent creases 8ª, which permit the pockets to expand to adapt themselves to cigars varying considerably in diameter. The numeral 10 indicates a so-called "spacing-bar," one of which is adapted to be secured by adhesive material or otherwise to each upturned end 4 of the base-strip 3.

The manner of putting together the parts described is as follows: The upper extensions 7 of the upturned webs 6 are inserted into the alternately-cut slits 9ª of the strip 8, and the uncut portions of the ridges 9 of the latter are forced down onto the upper edges of the said webs 6 and under the lock-shoulders 7ª. To effect this interlocking connection between the strips 3 and 8 requires the latter to be bent laterally to some extent or to be otherwise slightly bent out of shape; but the said strip 8 when interlocked under the shoulders 7ª will assume its normal shape and will be securely held to the strip 3 with its semicylindrical pockets positioned between and extending below the extensions 7. The webs 6 thus serve to support the pockets of the strip 8 and hold them properly spread out, while the extensions 7 afford dividing-partitions between the cigars and, further, as will presently appear, serve to support the base-strip 3 of the tray located just above. The upturned ends 4 of the base-strip 3 are inserted into the extreme end slits 9ª of the strip 8, and the slits 5 of said ends 4 embrace the uncut end portions of said strip 8. The projecting end portions of said strip 8 are turned downward against the end portions 4, and the central portions of the spacing-bars 10 are then secured to the said end portions 4 over the said downturned ends of the strip 8. The spacing-bars 10 are preferably made of pasteboard and are of such length as to extend from the front to the rear wall of the cigar-box, and thus keep the tray positioned at or in the vicinity of the central portion of the box. One of the trays described is placed on the bottom of the cigar-box and its pockets are filled with cigars. Then a second tray is placed upon the filled tray with its base-strip 3 resting upon the upturned portions 7 and upturned ends 4 of the said filled tray. The second tray is then loaded with cigars, and this is repeated until the trays and cigars fill the box. Over the top layer of cigars I preferably place a top strip 11, having end extensions 12, that extend transversely of the box and hold the said strip 11 positioned vertically over the filled trays. This strip 11 may be made ornamental and is well adapted to carry the trade mark or name of the brand of the cigar or various other matter.

It will be noted that the upturned portions 6 7 are cut from the strip 3 in such manner that the body of the strip is left strong and well connected at all points. It will also be noted that the tray is so designed that it may be constructed with scarcely any waste of paper.

The construction illustrated in Fig. 6 is quite similar to that illustrated in Figs. 1 to 5, inclusive; but in this arrangement intermediate trays are employed which have semicylindrical pockets, both on the upper and lower side thereof. This intermediate base-strip 13 is formed with upturned portions 14 and downturned portions 15, which engage the intermediate ridge portions 16 of the fluted pocket-forming strips 17. These strips 17 correspond to the strip 8 of the first-described construction, and they are formed with expansion-creases 19. The ends of the base-strip 13 are turned upward at 13ª, and transversely-extended spacing-bars 20 are secured thereto by adhesive material or other suitable means. As shown, the ends of the upper strip 17 are turned over the upper ends 13ª of the strip 13. The top and bottom trays are alike; but one is turned upward and the other downward. Each comprises a base-strip 21, a pocket-forming strip 22, and spacing-bars 23. The pockets of the strip 22 are creased at 22ª for the purpose indicated, and the strip 21 is formed with upturned portions 23, that engage the intermediate ridges of the said strips 22. The spacing-bars 23 are secured to the ends of the strips 21 and 22 by adhesive material or by other suitable means.

In the construction illustrated in Fig. 6 it is evident the semicylindrical pockets of a lower strip are supplemental to the downturned semicylindrical pockets of an overlying strip and that these supplemental pockets coöperate to hold the cigars. The manner of applying the several trays of this construction is obvious from the foregoing statement.

In Figs. 7 and 8 instead of the end spacing-bars I have shown a single spacer made from a flat piece of paper 24, cut out at 25 and slit at 26 to form feet-flanges 27 and 28. The said feet-flanges 27 are adapted to be turned in one direction and the said flange 28 in the opposite direction for engagement with the bottom of the box. The several tray-strips are adapted to be inserted into the large notch 25, cut in the body-plate 24, and when thus applied they will be held in alinement at the intermediate portion of the box.

From what has been said it will be understood that the devices herein specifically illustrated are capable of many modifications within the scope of my invention as herein set forth and claimed.

In all forms of the device the trays or sections which make up the filler hold the cigars out of contact with each other and relieve the cigars from such pressure from the box as is liable to press them out of shape.

What I claim, and desire to secure by Letters Patent of the United States, is as follows:

1. A tray for holding cigars made up of a base-strip and a fluted pocket-forming strip, said base-strip having vertically-projecting portions which engage and support the ridges of said pocket-forming strip, substantially as described.

2. A tray for holding cigars made up of a base-strip, and a pocket-forming strip, said base-strip having webs cut from the body thereof and turned upward and engaging the ridges formed between the pockets of the said pocket-forming strip, substantially as described.

3. A tray for holding cigars made up of a base-strip and a fluted pocket-forming strip, said base-strip having permanently-attached vertically-projecting web portions interlocking with the ridges of said pocket-forming strip, between the pockets thereof, substantially as described.

4. A tray for holding cigars made up of a base-strip and a fluted pocket-forming strip, said base-strip having web portions that engage and support the ridges of said pocket-forming strip, and which project through and above said ridges and serve to support overlying trays, substantially as described.

5. In a tray for holding cigars, a relatively stiff base-strip and a relatively pliable fluted pocket-forming strip, said base-strip having upturned webs cut from the body thereof in reverse order, and formed with reversely-extended intermediate notches, and said fluted strip having at its intervening ridges slits which embrace the upturned portions of said base-strip, and having its uncut ridge portions interlocked with the reversely-cut notches thereof, substantially as described.

6. The combination with a plurality of relatively narrow trays, having pockets for receiving the cigars, of spacing means acting on the several trays and projecting therefrom, at both sides thereof, beyond the sides of the several trays, for engagement with the sides of the cigar-box, to hold the said trays in said box, spaced apart from the sides thereof, substantially as described.

In testimony whereof I affix my signature in presence of two witnesses.

HENRY J. LEWIS.

Witnesses:
F. D. MERCHANT,
ROBERT C. MABEY.